US 9,134,990 B2

(12) United States Patent
Lo et al.

(10) Patent No.: US 9,134,990 B2
(45) Date of Patent: *Sep. 15, 2015

(54) SYSTEM AND METHOD FOR IMPLEMENTING A SECURE CLIENT HOSTED VIRTUALIZATION SERVICE LAYER IN AN INFORMATION HANDLING SYSTEM

(75) Inventors: Yuan-Chang Lo, Austin, TX (US); Shree Dandekar, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 570 days.

This patent is subject to a terminal disclaimer.

(21) Appl. No.: 13/104,683

(22) Filed: May 10, 2011

(65) Prior Publication Data

US 2011/0296408 A1 Dec. 1, 2011

Related U.S. Application Data

(63) Continuation-in-part of application No. 12/790,545, filed on May 28, 2010.

(51) Int. Cl.
*G06F 21/00* (2013.01)
*G06F 9/445* (2006.01)
*G06F 9/455* (2006.01)
*G06F 21/57* (2013.01)

(52) U.S. Cl.
CPC .............. *G06F 8/65* (2013.01); *G06F 9/45533* (2013.01); *G06F 21/572* (2013.01); *G06F 21/575* (2013.01)

(58) Field of Classification Search
USPC ........................ 713/191, 193; 718/1; 726/1; 717/168–173
See application file for complete search history.

(56) References Cited

U.S. PATENT DOCUMENTS

| 7,484,091 | B2 | 1/2009 | Bade et al. | |
|---|---|---|---|---|
| 8,131,987 | B2 | 3/2012 | Lo et al. | |
| 2003/0204722 | A1* | 10/2003 | Schoen et al. | 713/156 |
| 2005/0289336 | A1* | 12/2005 | Chen et al. | 713/2 |
| 2006/0161719 | A1 | 7/2006 | Bennett et al. | |
| 2006/0187848 | A1 | 8/2006 | Zaniolo et al. | |
| 2006/0225127 | A1 | 10/2006 | Roberts et al. | |
| 2006/0253705 | A1 | 11/2006 | Roberts et al. | |
| 2006/0287875 | A1 | 12/2006 | Reddy et al. | |
| 2007/0226795 | A1 | 9/2007 | Conti et al. | |
| 2007/0226975 | A1 | 10/2007 | Takeuchi et al. | |
| 2007/0300220 | A1 | 12/2007 | Seliger et al. | |

(Continued)

OTHER PUBLICATIONS

Zhi Wang & Xuxian Jiang. Hypersafe: A Lightweight Approach to Provide Lifetime Hypervisor Control-Flow Integrity. May 18, 2010. p. 1-16.

(Continued)

*Primary Examiner* — Jeffery Williams
*Assistant Examiner* — Christopher C Harris
(74) *Attorney, Agent, or Firm* — Larson Newman, LLP

(57) ABSTRACT

A client hosted virtualization system (CHVS) has a non-volatile memory that includes BIOS code and virtualization manager code that operates to initialize the CHVS and to launch a virtual machine. The CHVS establishes a secure communication channel with a client update system via a network interface, receives an update to the virtualization manager code, authenticates the update and overwrites the non-volatile memory with the update. The CHVS is configurable to execute the BIOS and not virtualization manager, or to execute the virtualization manager and not the BIOS.

20 Claims, 7 Drawing Sheets

(56) References Cited

U.S. PATENT DOCUMENTS

| | | |
|---|---|---|
| 2008/0184040 A1 | 7/2008 | Bade et al. |
| 2008/0189697 A1* | 8/2008 | Kachroo et al. ............. 717/171 |
| 2008/0201708 A1 | 8/2008 | Carter |
| 2008/0235804 A1 | 9/2008 | Bade et al. |
| 2008/0294808 A1 | 11/2008 | Mahalingam et al. |
| 2008/0301051 A1 | 12/2008 | Stahlberg |
| 2008/0320295 A1 | 12/2008 | Chong et al. |
| 2008/0320594 A1 | 12/2008 | Jiang |
| 2009/0006074 A1 | 1/2009 | Green |
| 2009/0006843 A1 | 1/2009 | Bade et al. |
| 2009/0007104 A1 | 1/2009 | Zimmer et al. |
| 2009/0013406 A1 | 1/2009 | Cabuk et al. |
| 2009/0038008 A1 | 2/2009 | Pike |
| 2009/0055571 A1 | 2/2009 | Budko et al. |
| 2009/0055918 A1 | 2/2009 | Chang et al. |
| 2009/0064274 A1 | 3/2009 | Zimmer et al. |
| 2009/0118839 A1 | 5/2009 | Accapadi et al. |
| 2009/0119087 A1 | 5/2009 | Ang et al. |
| 2009/0169012 A1 | 7/2009 | Smith et al. |
| 2009/0172378 A1 | 7/2009 | Kazmierczak et al. |
| 2009/0187848 A1 | 7/2009 | Murtagh |
| 2009/0193496 A1 | 7/2009 | Lakshminarayanan et al. |
| 2009/0222814 A1 | 9/2009 | Astrand |
| 2009/0264098 A1 | 10/2009 | Lo et al. |
| 2009/0288167 A1 | 11/2009 | Freericks et al. |
| 2009/0328170 A1 | 12/2009 | Williams et al. |
| 2010/0146251 A1* | 6/2010 | Lo et al. ............................ 713/1 |
| 2010/0153697 A1 | 6/2010 | Ford et al. |
| 2010/0169948 A1 | 7/2010 | Budko et al. |
| 2011/0072254 A1* | 3/2011 | Kuang et al. ..................... 713/2 |
| 2011/0154023 A1 | 6/2011 | Smith et al. |
| 2011/0197256 A1* | 8/2011 | Sharkey et al. ................... 726/1 |
| 2011/0214176 A1* | 9/2011 | Burch et al. .................... 726/15 |
| 2011/0296156 A1 | 12/2011 | Dandekar et al. |
| 2011/0296196 A1 | 12/2011 | Konetski et al. |
| 2011/0296410 A1 | 12/2011 | Lo et al. |
| 2012/0117381 A1 | 5/2012 | Lo et al. |

OTHER PUBLICATIONS

Zhi Wang & Xuxian Jiang. Hypersafe: A Lightweight Approach to Provide Lifetime Hypervisor Control-Flow Integrity. May 16-19, 2010. p. 1-29.

"Researchers to Cure Blue Pill Virtualization Attacks," Jackson, Joab, PCWorld Security News, May 7, 2010 http://www.pcworld.com/businesscenter/article/195882/researchers_to_cure_blue_pill_virtualization_attacks.html.

U.S. Appl. No. 12/316,940, filed Dec. 17, 2008.
U.S. Appl. No. 12/331,525, filed Dec. 10, 2008.
U.S. Appl. No. 12/790,545, filed May 28, 2010.

* cited by examiner

SYSTEM AND METHOD FOR IMPLEMENTING A SECURE CLIENT HOSTED VIRTUALIZATION SERVICE LAYER IN AN INFORMATION HANDLING SYSTEM

RELATED APPLICATIONS

This application is a continuation-in-part of U.S. patent application Ser. No. 12/790,545, filed on May 28, 2010, entitled "System and Method for Supporting Task Oriented Devices in a Client Hosted Virtualization System," by David Konetski et al., which is hereby incorporated by reference.

FIELD OF THE DISCLOSURE

The present disclosure generally relates to information handling systems, and more particularly relates to implementing a secure client hosted virtualization service layer in an information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, and networking systems. Information handlings systems can also implement various virtualized architectures.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

Figure 1:
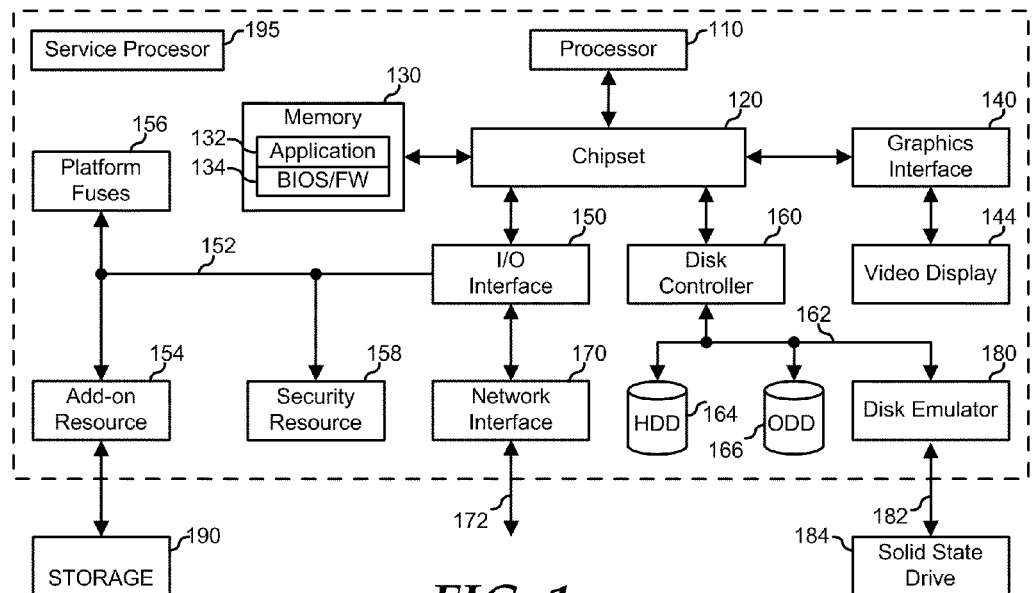
FIG. 1 is a functional block diagram illustrating an information handling system according to an embodiment of the present disclosure.

The following description in combination with the Figures is provided to assist in understanding the teachings disclosed herein. The description is focused on specific implementations and embodiments of the teachings. This focus is provided to assist in describing the teachings, and should not be interpreted as a limitation on the scope or applicability of the teachings. Other teachings can be used in this application. The teachings can also be used in other applications, and with different types of architectures, such as distributed computing architectures, client/server architectures, or middleware server architectures and associated resources.

In the embodiments described below, an information handling system can include any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

An information handling system can implement a secure client hosted virtualization (CHV) architecture with a CHV manager that resides in secure memory of the information handling system, and that receives secure updates from a managed backend. The CHV manager can launch one or more virtual machines on the information handling system. The CHV architecture can support I/O port assignment and I/O security policy implementation for the virtual machines. The CHV architecture can also provide a secure interface to security resources of the information handling system to provide pre-boot authentication, platform hardware and software authentication, secure biometric user authentication, and other trusted computing features for the virtual machines. The CHV manger can support task oriented devices such that each virtual machine obtains the functionality of the task oriented devices. The CHV manager also can support storage using full volume encryption (FVE) mechanisms, and provide access to common storage devices for multiple virtual machines.

FIG. 1 is a block diagram illustrating an embodiment of an information handling system 100, including a processor 110, a chipset 120, a memory 130, a graphics interface 140, an input/output (I/O) interface 150, a disk controller 160, a network interface 170, a disk emulator 180, and a service processor 190. In a particular embodiment, information handling system 100 is used to carry out one or more of the methods described below. In a particular embodiment, one or more of the systems described below are implemented in the form of information handling system 100.

Chipset 120 is connected to and supports processor 110, allowing processor 110 to execute machine-executable code. In a particular embodiment (not illustrated), information handling system 100 includes one or more additional processors, and chipset 120 supports the multiple processors, allowing for simultaneous processing by each of the processors and permitting the exchange of information among the processors and the other elements of information handling system 100. Chipset 120 can be connected to processor 110 via a unique channel, or via a bus that shares information among processor 110, chipset 120, and other elements of information handling system 100.

Memory 130 is connected to chipset 120. Memory 130 and chipset 120 can be connected via a unique channel, or via a bus that shares information among chipset 120, memory 130, and other elements of information handling system 100. In particular, a bus can share information among processor 110, chipset 120 and memory 130. In another embodiment (not illustrated), processor 110 is connected to memory 130 via a unique channel. In another embodiment (not illustrated), information handling system 100 can include separate memory dedicated to each of the one or more additional processors. A non-limiting example of memory 130 includes static random access memory (SRAM), dynamic random access memory (DRAM), non-volatile random access memory (NVRAM), read only memory (ROM), flash memory, another type of memory, or any combination thereof.

Graphics interface 140 is connected to chipset 120. Graphics interface 140 and chipset 120 can be connected via a unique channel, or via a bus that shares information among chipset 120, graphics interface 140, and other elements of information handling system 100. Graphics interface 140 is connected to a video display 144. Other graphics interfaces (not illustrated) can also be used in addition to graphics interface 140 if needed or desired. Video display 144 can include one or more types of video displays, such as a flat panel display or other type of display device.

I/O interface 150 is connected to chipset 120. I/O interface 150 and chipset 120 can be connected via a unique channel, or via a bus that shares information among chipset 120, I/O interface 150, and other elements of information handling system 100. Other I/O interfaces (not illustrated) can also be used in addition to I/O interface 150 if needed or desired. I/O interface 150 is connected via an I/O interface 152 to one or more add-on resources 154. Add-on resource 154 is connected to a storage system 190, and can also include another data storage system, a graphics interface, a network interface card (NIC), a sound/video processing card, another suitable add-on resource or any combination thereof. I/O interface 150 is also connected via I/O interface 152 to one or more platform fuses 156 and to a security resource 158. Platform fuses 156 functions to set or modify the functionality of information handling system 100 in hardware. Security resource 158 provides a secure cryptographic functionality and can include secure storage of cryptographic keys. A non-limiting example of security resource 158 includes a Unified Security Hub (USH), a Trusted Platform Module (TPM), a General Purpose Encryption (GPE) engine, another security resource, or a combination thereof.

Disk controller 160 is connected to chipset 120. Disk controller 160 and chipset 120 can be connected via a unique channel, or via a bus that shares information among chipset 120, disk controller 160, and other elements of information handling system 100. Other disk controllers (not illustrated) can also be used in addition to disk controller 160 if needed or desired. Disk controller 160 can include a disk interface 162. Disk controller 160 can be connected to one or more disk drives via disk interface 162. Such disk drives include a hard disk drive (HDD) 164 or an optical disk drive (ODD) 166 such as a Read/Write Compact Disk (R/W-CD), a Read/Write Digital Video Disk (R/W-DVD), a Read/Write mini Digital Video Disk (R/W mini-DVD, another type of optical disk drive, or any combination thereof. Additionally, disk controller 160 can be connected to disk emulator 180. Disk emulator 180 can permit a solid-state drive 184 to be coupled to information handling system 100 via an external interface 182. External interface 182 can include industry standard busses such as USB or IEEE 1394 (Firewire) or proprietary busses, or any combination thereof. Alternatively, solid-state drive 184 can be disposed within information handling system 100.

Network interface device 170 is connected to I/O interface 150. Network interface 170 and I/O interface 150 can be coupled via a unique channel, or via a bus that shares information among I/O interface 150, network interface 170, and other elements of information handling system 100. Other network interfaces (not illustrated) can also be used in addition to network interface 170 if needed or desired. Network interface 170 can be a network interface card (NIC) disposed within information handling system 100, on a main circuit board such as a baseboard, a motherboard, or any combination thereof, integrated onto another component such as chipset 120, in another suitable location, or any combination thereof. Network interface 170 includes a network channel 172 that provide interfaces between information handling system 100 and other devices (not illustrated) that are external to information handling system 100. Network interface 170 can also include additional network channels (not illustrated).

Service processor 195 is preferably a micro-controller embedded in information handling system 100 that enables remote monitoring and management of the information handling system. Service processor 195 is separate from processor 110, and runs separate code on a separate operating system from the code and operating system of the information handling system. In a particular embodiment, service processor 195 includes a separate network channel similar to network channel 172 for communicating with management services (not illustrated) that are external to information handling system 100. In another embodiment, service processor 195 is connected to network interface 170 to gain access to network channel 172.

In a particular embodiment, service processor 195 is powered separately from the rest of information handling system 100, and is implemented such that the service processor remains powered on when the rest of the information handling system is powered off. Moreover, service processor 195 includes connections to the components of information handling system 100 such that status information for the information handling system is available to the service processor when the information handling system is powered off. For example, service processor 195 can be connected to chipset 120, memory 130, graphics interface 140, I/O interface 150, disk controller 160, another component of information handling system 100, or to a combination of components of the information handling system. Service processor 195 operates at a hardware level, and can be configured in accordance with the Intelligent Platform Management Interface standard. As such, service processor 195 carries out data logging, sets system event traps, maintains system event logs, and permits access to information handling system 100 via a Virtual KVM (Keyboard/Video/Monitor).

Information handling system 100 includes one or more application programs 132, and Basic Input/Output System and Firmware (BIOS/FW) code 134. BIOS/FW code 134 functions to initialize information handling system 100 on power up, to launch an operating system, and to manage input and output interactions between the operating system and the other elements of information handling system 100. In a particular embodiment, application programs 132 and BIOS/FW code 134 reside in memory 130, and include machine-executable code that is executed by processor 110 to perform various functions of information handling system 100. In another embodiment (not illustrated), application programs and BIOS/FW code reside in another storage medium of information handling system 100. For example, application programs and BIOS/FW code can reside in HDD 164, in a ROM (not illustrated) associated with information handling system 100, in an option-ROM (not illustrated) associated with various devices of information handling system 100, in storage system 190, in a storage system (not illustrated) associated with network channel 172, in another storage medium of information handling system 100, or a combination thereof. Application programs 132 and BIOS/FW code 134 can each be implemented as single programs, or as separate programs carrying out the various features as described herein.

Figure 2:
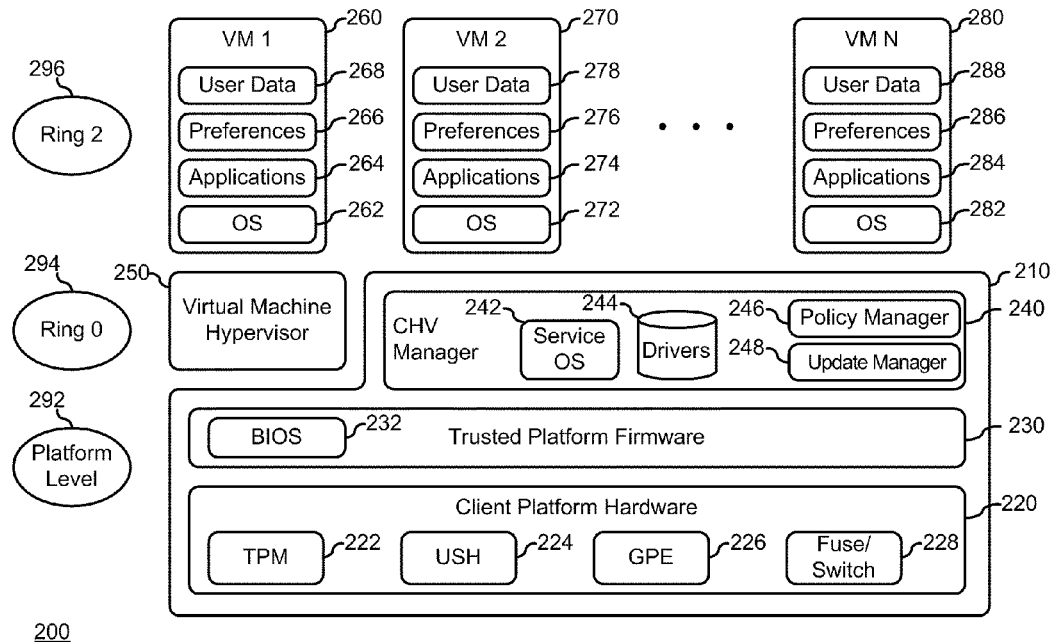
FIG. 2 illustrates an embodiment of a client hosted virtualization system on an information handling system.

FIG. 2 illustrates an embodiment of a CHV system 200 including a client system 210 operating at a platform level 292, an optional virtual machine hypervisor 250 operating at a protection level 294 that is the most protected level, virtual machines 260 and 270, and one or more additional virtual machines 280 operating at a protection level 296 that is above protection level 294, or less protected than virtual machine hypervisor 250. At the platform level 292, client system 210 includes client platform hardware 220, trusted platform firmware 230, and a CHV manager 240. In a particular embodiment, client system 210 is an information handling system similar to information handling system 100. As such, client platform hardware 220 includes a processor (not illustrated) that operates to execute machine-executable code included in trusted platform firmware 230 and CHV manager 240 to perform the functions of CHV system 200. Client platform hardware 220 also includes a TPM 222, a USH 224, a GPE 226, and a fuse/switch bank 228. Trusted platform firmware 230 includes a BIOS 232. CHV manager 240 may include any or all of a service operating system (OS) 242, a stack of drivers 244, a policy manager 246, and an update manager 248. In a particular embodiment, virtual machine hypervisor 250 is a commercially available hypervisor such as Xen, VMware, or other such virtualization systems that may reside in a mass storage device (not illustrated).

CHV manager 240 operates from the platform level 292 to initialize CHV system 200 on power up, to launch virtual machines 260, 270, and 280, and to manage input and output interactions between virtual machines 260, 270, and 280 and client platform hardware 220. In this respect, CHV manager 240 functions similarly to a combination of a platform BIOS and a virtual machine manager or hypervisor. As such, CHV manager 240 is stored in a non-volatile memory (not illustrated) of client platform hardware 220, such as a firmware ROM embedded on the system board that is separate from the mass storage device used to store the images for virtual machines 260, 270, and 280, and that retains the code stored thereon when client system 210 is powered. In a particular embodiment, CHV manager 240 provides that the launching of virtual machines 260, 270, and 280 is secure, using digital signatures to verify the authenticity of the virtual machine images for virtual machines 260, 270, and 280. For example, client system 210 can include hardware extensions with security capabilities to ensure secure launch and execution of virtual machines 260, 270, and 280, such as Trusted Execution Technology (TXT) or other hardware extension technology. In a particular embodiment, CHV manager 240 operates with GPE 226 to fully encrypt virtual machines 260, 270, and 280 in storage. By operating CHV manager from the platform level 292, client system 210 is secure from malicious software or virus attacks that might otherwise affect the operations of client system 210. Moreover, by encrypting virtual machines 260, 270, and 280, CHV system 200 provides a tamper resistant storage method for the images of virtual machines 260, 270, and 280.

In an optional embodiment, virtual machine hypervisor 250 can be operated at protection level 294 to launch virtual machines 260, 270, and 280. Note that one of CHV manager 240 or virtual machine hypervisor 250 is selected to launch virtual machines 260, 270, and 280, and that where one of the CHV manager or the virtual machine hypervisor is operating to manage the virtual machines, the other is not operating to manage the virtual machines. When launched, virtual machines 260, 270, and 280 each include associated user data 268, 278, and 288; associated user preference information 266, 276, and 286; associated applications 264, 274, and 284; and associated operating systems 262, 272, and 282, respectively. Thus each virtual machine 260, 270, and 280 is isolated from the others, operates as an individual information handling system on client system 210, and shares the resources of client platform hardware 220. The operating CHV manager 240 or virtual machine hypervisor 250 functions to manage the access of each of virtual machines 260, 270, and 280 to the resources of client platform hardware 220. Virtual machines 260, 270, and 280 can include anti-virus software (not illustrated) that is tailored to the associated OSs 268, 278, and 288, thus providing an additional layer of security to the operations of CHV system 200.

The configuration of client platform 210 is determined by the particular devices and architecture of client platform hardware 220 and the content of trusted platform firmware 230 and CHV manager 240. The devices and architecture of client platform hardware 220 is determined at the time of manufacture of client system 210. The content of trusted platform firmware 230 and CHV manager 240 is installed on a non-volatile memory storage device (not illustrated) in client platform hardware 220 at the time of manufacture. In a particular embodiment, the manufacturer or a user of client platform 210 determines that the client platform is intended for use as a client hosted virtualization platform, and initiates a hardware function to toggle an element of fuse/switch bank 228 to enable CHV manager 240. For example, the manufacturer can provide client platform 210 with CHV manager 240 enabled by toggling the element of fuse/switch bank 228 prior to shipment to the user. In another example, the manufacturer can provide client platform 210 with BIOS 232 enabled by shipping the client platform to the user with the element of fuse/switch bank 228 intact, such that client platform 210 boots using BIOS 232. Here, the manufacturer can provide a way for the user to toggle the element of fuse/switch bank 228 to enable CHV manager 240. For example, the user can be presented with an option to enable CHV manager 240 the first time client platform 210 is turned on, or client platform 210 can include a BIOS option to enable the CHV manager.

In a particular embodiment, toggling the element of fuse/switch bank 228 permanently enables CHV manager 240. Here, each time client platform 210 is booted, trusted platform firmware 230 performs low level system boot activities, and then passes control to CHV manager 240. An example of permanently enabling CHV manager 240 can include writing to a particular bit or set of bits in a write-once device, such as by blowing a hardware fuse in fuse/switch bank 228 that permanently provides for a boot path that passes control to CHV manager 230, locking a boot block, writing to a programmable ROM such as an EPROM or a flash device, providing another type of hardware switch, or a combination thereof. Another example can include providing a particular bit or set of bits in fuse/switch bank 228 in a platform ROM (not illustrated) that is not re-writable. In the case of blowing a hardware fuse, the hardware fuse can be blown at the time of manufacture of client system 210, or by a user of client system at a later date. In the case of providing bits in a platform ROM, the bits can be provided at the time of manufacture of client system 210. In another embodiment, toggling the element of fuse/switch bank 228 can be performed by a software function. For example, a hardware hash can be erased, a state authentication certificate can be authenticated by TPM 222, another software function can be performed, or a combination thereof.

In another embodiment, client platform 210 includes a mechanism to selectively override the permanent enablement of CHV manager 240 such that when client platform 210 is booted, BIOS 232 performs low level system boot activities, and then passes control to virtual machine hypervisor 250. For example, the particular bit or set of bits in fuse/switch bank 228 can reside in a re-writeable non-volatile memory, such that client platform 210 can be reprogrammed to disable CHV manager 240. In another example, a boot option provided by trusted platform firmware 230 can prompt a user of client platform 210 as to whether to boot to CHV manager 240 control, or to virtual machine hypervisor 250 control. In yet another example, a hardware jumper, a hardware switch, or a BIOS settable switch can be provided whereby in a first position client platform 210 boots using BIOS 232, and in a second position the client platform enables CHV manager 240.

When control of client system 210 is passed to the CHV manager, CHV manager 242 launches service OS 242 to establish the controlled virtualization environment, including launching virtual machines 250, 260, and 270, and controlling the elements of client platform hardware 220. Service OS 242 supports I/O port assignment between virtual machines 250, 260, and 270 and client platform hardware 220, and provides a secure interface to TPM 222, USH 224, and GPE 226 for pre-boot authentication, platform hardware and software authentication, secure biometric user authentication, and other trusted computing features for the virtual machines. Service OS 242 also supports task oriented devices and FVE storage for virtual machines 250, 260, and 270, and provides access to common storage devices. Policy manager 246 implements security policies between virtual machines 250, 260, and 270 and the devices of client platform hardware 220. Because the content of trusted platform firmware 230 and CHV manager 240 resides on the non-volatile memory storage device, the trusted platform firmware code and the CHV manager code is executed securely within platform level 292, and the basic operation of client system 210 is less susceptible to attack from malicious program code, viruses, worms, or other corrupting programs, and client system 210 embodies a secure CHV architecture.

Figure 3:
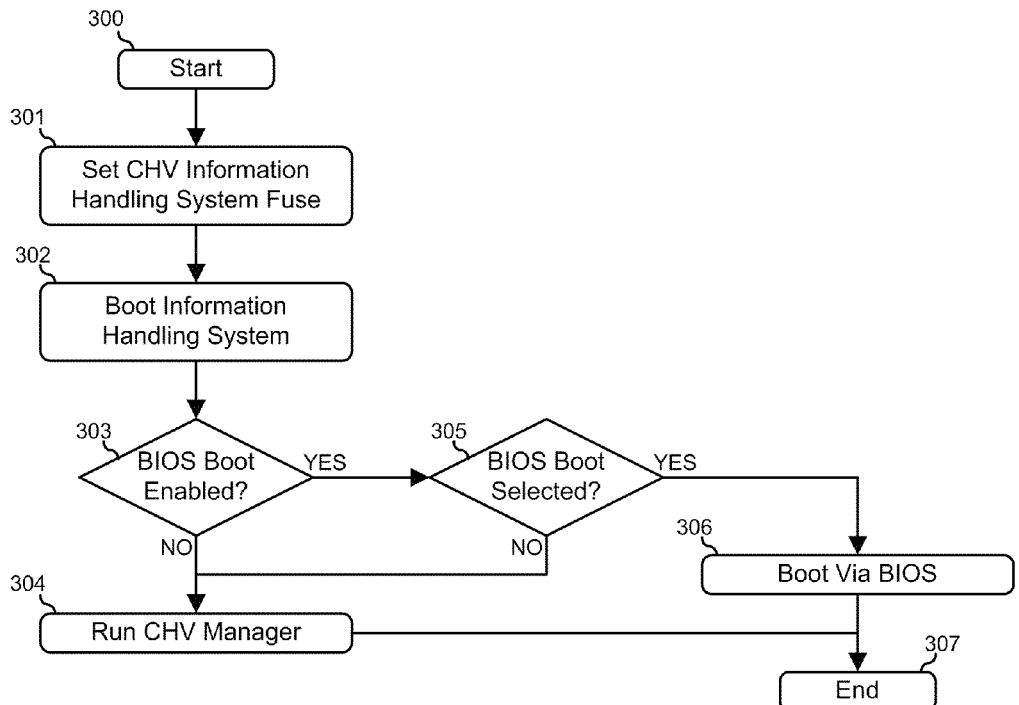
FIG. 3 is a flow chart illustrating an embodiment of a method of providing a client hosted virtualization system.

FIG. 3 illustrates an embodiment of a method of providing a CHV system in a flowchart form, starting at block 300. A CHV platform fuse is set in an information handling system in block 301. For example, a manufacturer of client platform 210 can determine that client platform 210 is intended for use as CHV system 200, and can set a fuse in fuse/switch bank 228. In an embodiment (not illustrated), a user or manufacturer of client platform 210 can write a particular bit or set of bits to platform ROM to configure client system 210 as CHV system 200. The information handling system is booted in block 302, and a decision is made as to whether or not the information handling system has a BIOS boot option enabled in decision block 303. For example client platform 210 may or may not include a boot option that permits client platform 210 to boot with BIOS 232. If the information handling system does not have a BIOS boot option enabled, the "NO" branch of decision block 303 is taken, the boot process runs a CHV manager in block 304, and the method ends in block 314. Thus client platform 210 can not have a BIOS boot option, and can launch CHV manager 240 and proceed to launch virtual machines 250, 260, and 270.

If the information handling system has a BIOS boot option enabled, the "YES" branch of decision block 303 is taken, and a decision is made as to whether or not the BIOS boot option has been selected in decision block 305. If not, the "NO" branch of decision block 305 is taken, the boot process runs the CHV manager in block 304, and the method ends in block 307. If the BIOS boot option is selected, the "YES" branch of decision block 305 is taken, the boot process proceeds to boot in BIOS in block 306, and the method ends in block 307. For example, a user of client platform 210 may select a boot option to boot client platform 210 with BIOS 232, and client platform 210 can then boot using BIOS 232, and can then launch virtual machine hypervisor 250 or another conventional operating system on the bare system.

The content of trusted platform firmware 230 and CHV manager 240 is alterable by reprogramming the non-volatile memory storage device, permitting revision control of the contents of trusted platform firmware 230 and CHV manager 240. For example, firmware code associated with the devices of client platform hardware 220, such as drivers, application programming interfaces (APIs), or user interfaces (UIs) in trusted platform firmware 230, or the BIOS code associated with BIOS 232 can be periodically updated or modified. Similarly, CHV manager code associated with service OS 242, drivers 244 or update manager 248, or policy profile data associated with policy manager 246 can be periodically updated or modified. Here, the fact that trusted platform firmware 230 and CHV manager 240 are stored in the non-volatile memory storage device ensures a level of security related to the ability to perform updates.

In another embodiment, update manager 248 functions in cooperation with TPM 222 to provide an encryption and authentication capability with regard to updates to trusted platform firmware 230 and CHV manager 240. Here, the capability to perform an update is enabled by a locked platform feature, where the key to unlock the feature is associated with a public key infrastructure (PKI). Updates to trusted platform firmware 230 or to CHV manager 240 include key information. When update manager 248 receives an update to trusted platform firmware 230 or to CHV manager 240, update manager 248 provides the key information to TPM 222 to authenticate the update. If the update is authenticated, then update manager 248 proceeds to implement the update. If the update is not authenticated, the update manager 248 does not implement the update. In a particular embodiment, updates to trusted platform firmware 230 or to CHV manager 240 are also encrypted, and TPM 222 decrypts authenticated updates prior to being implemented by update manager 248.

Figure 4:
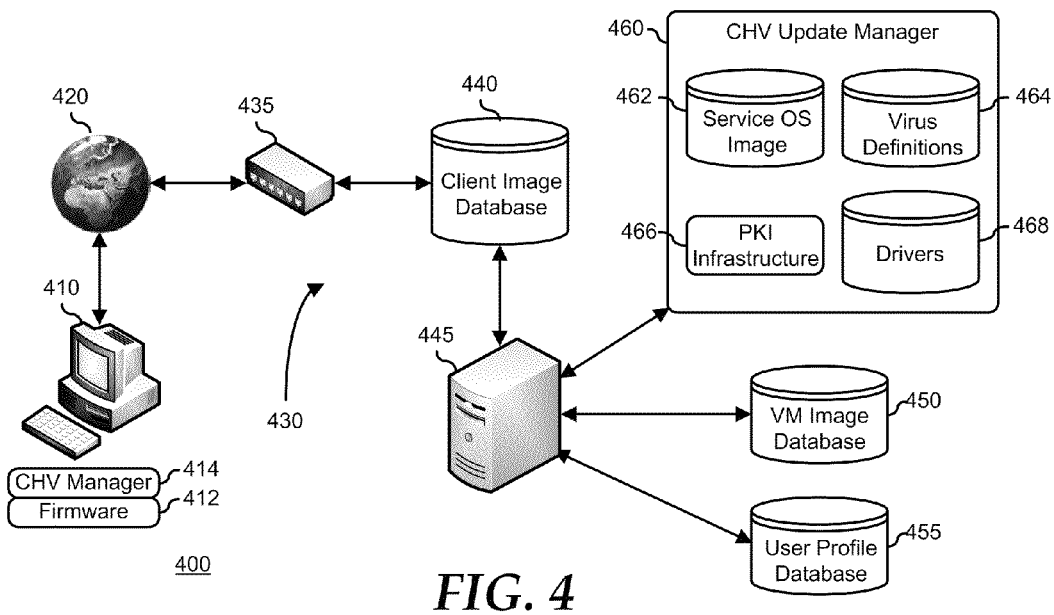
FIG. 4 is a functional block diagram illustrating an embodiment of a client hosted virtualization update network.

FIG. 4 illustrates an embodiment of a CHV update network 400 including a client system 410, a network 420, and a CHV update system 430. CHV update system 430 includes a network interface 435, a client image database 440, a client image compiler 445, a virtual machine image database 450, user profile database 455, and a CHV update manager 460, and can be implemented as a server component of CHV update network 400. CHV update manager 460 includes a service OS image 462, virus definitions database 464, a PKI infrastructure 466, and drivers database 468. Client system 410 is similar to client system 210, and can implement a CHV system similar to CHV system 200. Client system 410 is connected to network 420 via a network channel similar to network channel 172 of information handling system 100. Network 420 represents a network connection between client system 410 and CHV update system 430, and can include public networks such as the Internet or other public networks, or private networks such as private internets or other private networks.

CHV update system 430 communicates with client system 410 through network interface 435 which is connected to network 420. In a particular embodiment, CHV update system 430 determines when a trusted platform firmware 412 or a CHV manager 414 in client system 410 is in need of an update, and CHV update system 430 pushes the needed update to firmware 412 or to CHV manager 414, and an update manager (not illustrated) in CHV manager 414 performs the update to client system 410. In another embodiment, client system 410 periodically polls CHV update system 430 to determine if updates are available for firmware 412 or for CHV manager 414. If an update is available, then client system 410 pulls the available update for firmware 412 or for CHV manager 414, and the update manager performs the update to client system 410.

CHV update system 430 functions to create and maintain the updates for client system 410. As such, the components that make up firmware 412 and CHV manager 414 are stored and maintained in a current state in CHV update manager 460. Thus the operating code for firmware 412 and CHV manager 414 is maintained and updated with new capabilities, fixes to defective capabilities, patches to insecure capabilities, other updates, or a combination thereof. For example, a development team (not illustrated) can maintain the operating code for a service OS, storing modified images in service OS image 462, can store virus definitions for an anti-virus capability of the service OS in virus definitions database 464, and can store drivers associated with the various hardware components of client system 410 in drivers database 468. CHV update manager 460 combines the contents of service OS image 462, virus definitions database 464, and drivers database 468 to provide updates for firmware 412 and CHV manager 414, and encodes the updates with PKI infrastructure 466 to provide a secure update for client system 410. Client image compiler 445 receives the secure update from CHV update manager 460, and combines the secure update with updated virtual machine images from virtual machine image database 450, and with updated user profiles from user profile database 455 to create a client image for client system 410. Client image compiler 445 stores the client image in client image database 440 to be pushed to or pulled from client system 410.

Figure 5:
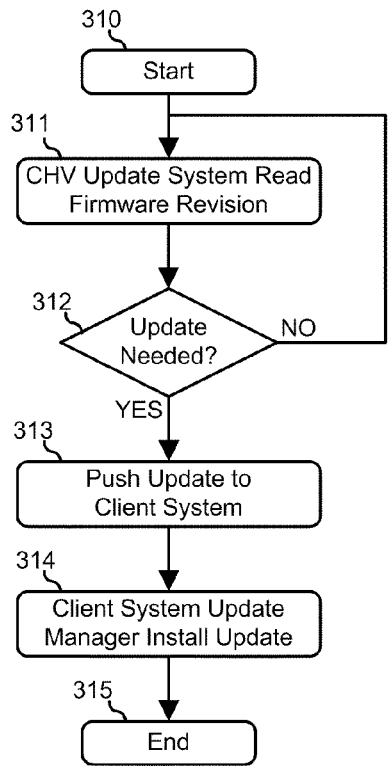
FIGS. 5 and 6 are flow charts illustrating embodiments of methods for receiving updates to a client hosted virtualization system.

FIG. 5 illustrates an embodiment of a method of pushing an update to a client system in a flowchart form, starting at block 310. A CHV update system reads a firmware and CHV manager revision level from a client system in block 311. For example, CHV update system 430 can determine a revision level for firmware 412 and for CHV manager 414 in client system 410. A decision is made as to whether or not the firmware or the CHV manager are in need of updating in decision block 312. If not, the "NO" branch of decision block 312 is taken, and processing returns to block 311, where the CHV update system reads a firmware and CHV manager revision level from the client system. Here, CHV update system 430 can perform the reads of client system 410 on a periodic basis to ensure that client system 410 includes current revisions of firmware 412 and CHV manager 414. If the firmware or the CHV manager are in need of updating, the "YES" branch of decision block 312 is taken, and the CHV update manager pushes the update to the client system in block 313. Thus client image compiler 445 can combine the elements that are in need of updating from among virtual machine image database 450, user profile database 455, service OS image 462, virus definitions 464, and drivers 468, and CHV update system 430 can send the client image to client system 410. An update manager in the client system installs the update in block 314, and the method ends in block 315. Here, when client system 410 receives the update from CHV update system 430, an update manager (not illustrated) can determine if the update is authentic using a TPM (not illustrated) and then can install authentic the update if it is determined to be authentic.

Figure 6:
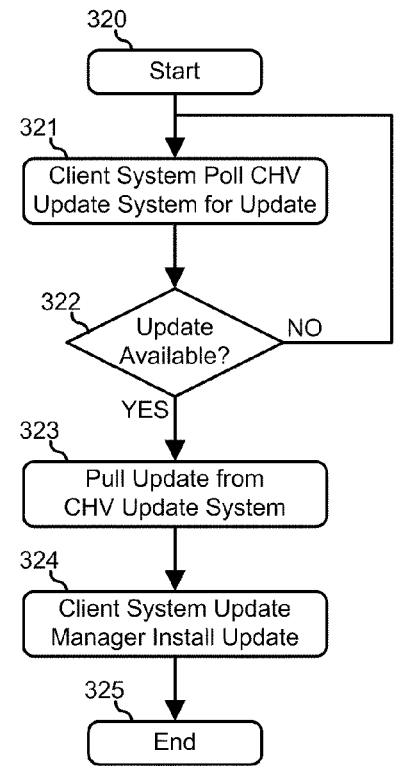

FIG. 6 illustrates an embodiment of a method of pulling an update to a CHV update system in a flowchart form, starting at block 320. A client system polls the CHV update system to determine if an update is available for a firmware or a CHV manager on the client system in block 321. For example, client system 410 can poll CHV update system 430 to determine if an update is available for firmware 412 or for CHV manager 414. A decision is made as to whether or not a firmware or CHV manager update are available in decision block 322. If not, the "NO" branch of decision block 322 is taken, and processing returns to block 321, where the client system polls the CHV update system to determine if an update is available for the firmware or the CHV manager. Here, client system 410 can poll CHV update system 430 on a periodic basis to ensure that client system 410 includes current revisions of firmware 412 and CHV manager 414. If a firmware or CHV manager update are available, the "YES" branch of decision block 322 is taken, and the client system pulls the updated firmware or CHV manager from the CHV update manager in block 323. Thus a compiled client image can be stored in client image database 440, and client system 410 can request the client image from CHV update system 430. An update manager in the client system installs the update in block 324, and the method ends in block 325. Here, when client system 410 receives the update from CHV update system 430, the update manager can determine if the update is authentic using the TPM and then can install authentic the update if it is determined to be authentic.

In a particular embodiment, client system 410 includes a TPM similar to TPM 222 that can provide PKI-based authentication and encryption/decryption functions for the client system, a CHV manager similar to CHV manager 240, and a service OS similar to service OS 242. Here, the service OS accesses the TPM to establish a PKI session with PKI infrastructure 466 in order to provide a secure communication channel between the service OS and CHV update system 430. When the secure communication channel is established, client system 410 is authenticated onto CHV update system 430, and can receive updated firmware and CHV manager code. In another embodiment, the service OS establishes a virtual private network (VPN) session with CHV update system 430 to authenticate client system 410. The PKI session and the VPN session can be maintained while client system 410 is connected to network 420. Additionally, updates to the firmware and the CHV manager code can be digitally signed, for example by applying a hash function to the update, and the digital signature can be verified in client system 410 prior to implementing the updates. The VPN can also be established using other cryptographic tunneling protocols, such as Internet Protocol Security (IPsec), Secure Socket Layer (SSL), Datagram Transport Layer Security (DTLS), or another protocol, as needed or desired.

In a particular embodiment, CHV update system 430 is provided by the manufacturer of client system 410, such that updates related to the client system hardware or firmware are provided in a timely manner. In another embodiment, CHV update system 430 is provided by an information technology (IT) resource that is associated with the owner of client system 410. Here, the owner can easily enforce policies in client system 410, as described below.

Figure 7:
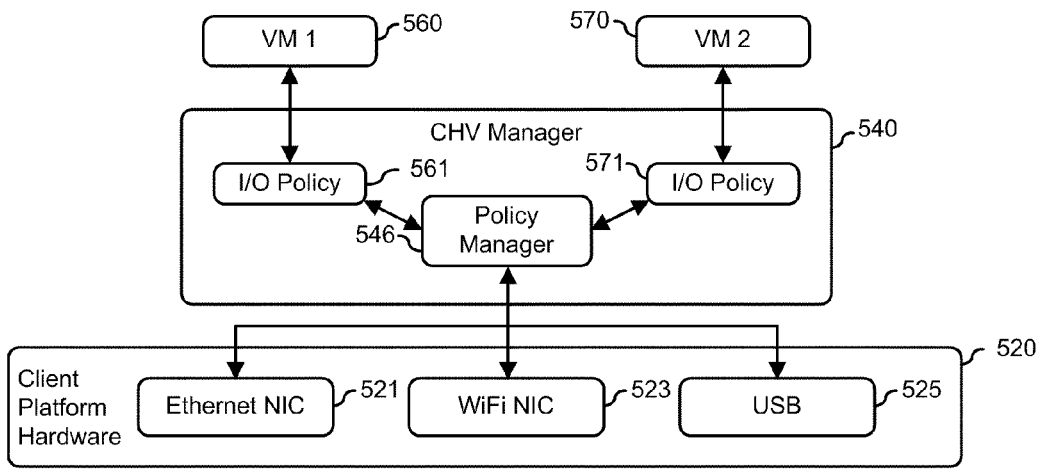
FIG. 7 is a functional block diagram illustrating another embodiment of a client hosted virtualization system for implementing I/O port assignment and security policy application.

FIG. 7 illustrates an embodiment of a CHV system 500 including client platform hardware 520, a CHV manager 540, and virtual machines 560 and 570. Client platform hardware 520 includes an Ethernet NIC 521, a wireless local area network (WiFi) NIC 523, and a USB port 525, and can include one or more additional I/O resources (not illustrated). CHV manager 540 includes a policy manager 548. Virtual machines 560 and 570 each include I/O policy information 561 and 571, respectively. In a particular embodiment, CHV manager 540 is in control of access to Ethernet NIC 521, WiFi NIC 523, USB port 525, and other I/O resources. As such, requests for I/O access from virtual machines 560 and 570 are provided to CHV manager 540, and policy manager 548 determines if the requested I/O access is permitted, based upon the requesting virtual machine's 560 or 570 respective I/O policy information 561 or 571. In the illustrated embodiment, I/O policy information 561 and 571 are included in CHV manager 540. In another embodiment (not illustrated), I/O policy information 561 is included in virtual machine 560 and I/O policy information 571 is included in virtual machine 570. In another embodiment (not illustrated), a portion of I/O policy information 561 and 571 is included in CHV manager 540, and another portion of I/O policy information 561 and 571 is included in virtual machines 560 and 570, respectively.

Policy manager 546 enforces granular control of access to Ethernet NIC 521, WiFi NIC 523, USB port 525, and other I/O resources. Policy manager 546 permits certain types of access requests and denies other access requests, and permits conditional access to the various resources of client platform hardware 520. As such, I/O policy information 561 and 571 can provide for unrestricted access, blocked access, or conditional access depending on the resource, on the user of the respective virtual machine 560 or 570, on the content included in the access request, on the target of the access request, or on other conditions as needed. For example, I/O policy information 561 may dictate that virtual machine 560 has unrestricted access to Ethernet NIC 521, may not access USB port 525, and has conditional access to WiFi NIC such that only access to a corporate WiFi network is permitted. Other examples include permitting access to USB port 525 only when the device connected to the USB port is an authenticated storage device, or when the device connected to the USB port is a human interface device such as a mouse or a keyboard. I/O policy information 561 and 571 can also provide for user consent each time a resource is accessed and for logging of file transfers to and from the resource. The content transferred into and out of the respective virtual machines 560 and 570 can also be filtered such that inbound transfers can be checked for malware or viruses, and outbound transfers can be checked to prevent data leaks.

Figure 8:
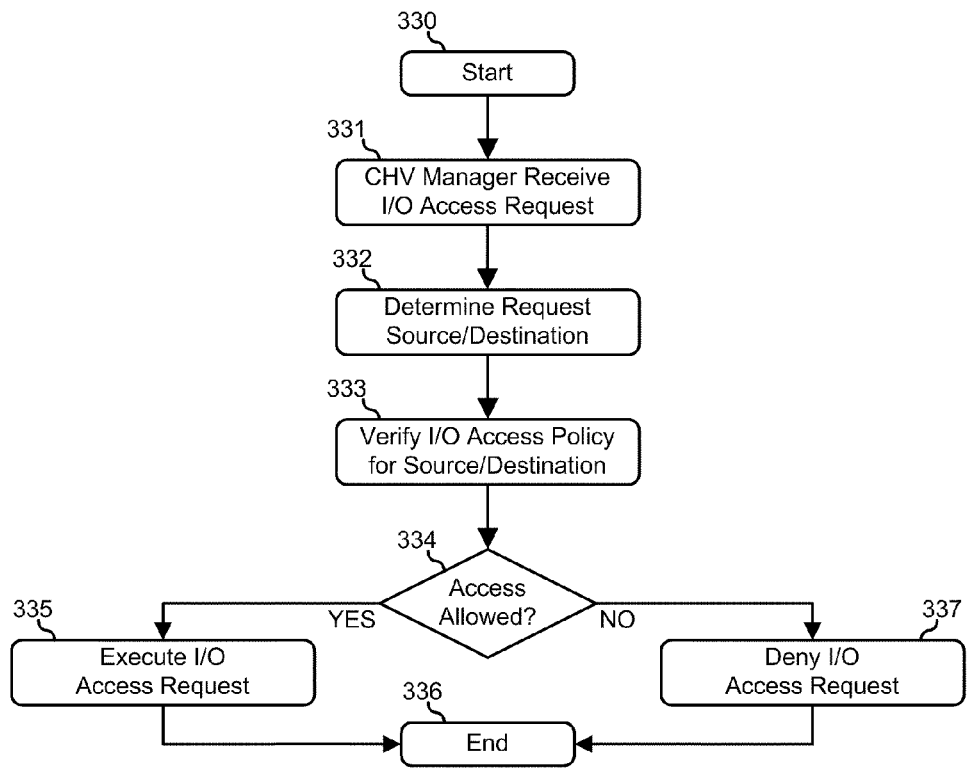
FIG. 8 is a flow chart illustrating an embodiment of a method of implementing I/O policies in a client hosted virtualization system.

FIG. 8 illustrates an embodiment of a method of implementing I/O policies in a CHV system. Starting at block 330, a CHV manager receives an I/O access request in block 331. For example, virtual machine 560 can attempt to initiate a file transfer over Ethernet NIC 521, or a USB device plugged into USB port 525 can attempt to enumerate itself to virtual machine 570, and CHV manager 520 can receive the transaction requests. The CHV manager determines the source and destination of the I/O access request in block 332, and verifies an I/O access policy for I/O access requests with the determined source and destination in block 333. Thus CHV manager 520 can identify the source and destination of the file transfer from virtual machine 560 to Ethernet NIC 521, and can access I/O policy information 561 to determine if the requested file transfer is permitted. Here, CHV manager can also determine the user associated with virtual machine 560, the contents of the file to be transferred, or other information related to the I/O policy for virtual machine 560. A decision is made as to whether or not the requested I/O access is allowed in decision block 334. If so, the "YES" branch of decision block 334 is taken, the requested I/O access request is executed in block 335, and the method ends in block 336. For example, CHV manager 520 can determine that the file transfer from virtual machine 560 to Ethernet NIC 521 is allowed and can execute the file transfer. If the requested I/O access is not allowed, the "NO" branch of decision block 334 is taken, the requested I/O access request is denied in block 337, and the method ends in block 336. For example, CHV manager 520 can determine that virtual machine 570 is to be denied access to USB port 525 and can block the USB device from enumerating itself to virtual machine 570.

In a particular embodiment, I/O policy information 561 and 571 are provided to CHV system 500 by a CHV update system similar to CHV update system 430. Thus, in the above embodiment where the CHV update system is provided by the IT resource associated with the owner of CHV system 500, the IT resource can log onto the CHV system to provide updates to I/O policy information 561 and 571, to set the I/O policies, and to limit or expand the functionality of the CHV system as needed or desired. In a particular embodiment, I/O policy information 561 and 571 can include security policy information and update policy information. The security policy information sets the bounds for the capabilities of virtual machines 560 and 570, respectively. For example, the security policy information can provide for the ability or inability of the associated virtual machine to access the Internet, or particular locations on the Internet, the ability to run or not run outside of a corporate network, the ability to access, change or delete information in a storage network, or other security abilities. The update policy information sets the parameters for CHV system 500 to access the CHV update system. For example, the update policy can determine a frequency of connection to the CHV update system to check for updates, set a patch prioritization for CHV system 500, or set other parameters related to the connection to the CHV update system. Moreover, the CHV update system can be utilized in conjunction with other features of CHV system 500. For example, a service processor can detect the presence of a network connection prior to power on of CHV update system 500.

Figure 9:
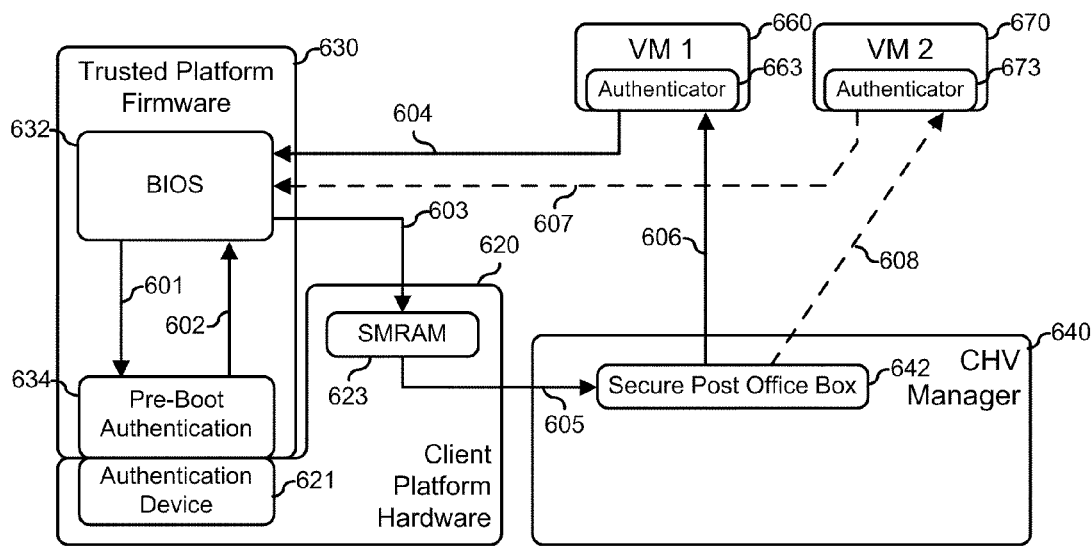
FIG. 9 is a functional block diagram illustrating another embodiment of a client hosted virtualization system and a method of providing pre-boot authentication in the client hosted virtualization system.

FIG. 9 illustrates an embodiment of a CHV system 600 including client platform hardware 620, trusted platform firmware 630, a CHV manager 640, and virtual machines 660 and 670. Client platform hardware 620 includes an authentication device 621 and a system management random access memory (SMRAM) 623. An example of authentication device 621 includes a keyboard for entering a password, a unified security hub similar to USH 224 connected to a biometric input device (not illustrated) or a smart card reader (not illustrated), another type of authentication device, or a combination thereof. Trusted platform firmware 630 includes a BIOS 632 and a pre-boot authentication module 634. CHV manager 640 includes a secure post office box module 642. Virtual machines 660 and 670 include authenticator modules 663 and 673, respectively. An example of authenticator modules 663 and 673 includes a graphical identification and authentication (GINA) module, another type of authenticator interface, or a combination thereof.

Pre-boot authentication provides a way to authenticate CHV system 600 prior to the launch of virtual machines 660 and 670 such that only authenticated users gain access to the devices and resources of CHV system 600. FIG. 9 illustrates an embodiment of a method of providing pre-boot authentication in CHV system 600. Here, BIOS 632 generates a pre-boot authentication request 601 to pre-boot authentication module 634. Pre-boot authentication module 634 includes a sequestered operating environment that prompts the user for authentication. The user provides the authentication information via authentication device 621. Pre-boot authentication module 634 verifies the authenticity of the authentication information, and if the authentication information is verified, generates an authentication object and generates a pre-boot authentication response 602 that sends the authentication object to BIOS 632. BIOS 632 generates an authentication object store 603 that stores the authentication object in SMRAM 623. Upon completion of the authentication object store 603, BIOS 632 passes execution to CHV manager 640.

When CHV manager 640 launches virtual machine 660, the user of virtual machine 660 needs the authentication object in order to gain access to the devices and resources of CHV system 600. To obtain the authentication object, authenticator 663 generates an authentication request 604 to BIOS 632 in system management mode (SMM). In response to a first authentication request, the BIOS generates an authentication object transfer 605, sending the authentication object from SMRAM 623 to secure post office box module 642 in CHV manager 640. CHV manager 640 then generates an authentication response 606 to send the authentication object from secure post office box module 642 to authenticator 663, thus providing virtual machine 660 with authenticated access to the devices and resources of CHV system 600. Secure post office box module 642 retains the authentication object for subsequent authentication requests, such as authentication request 607 generated by authenticator 673 in virtual machine 670, in response to which CHV manager 640 generates the authentication response 608 to send the authentication object to authenticator 673. In another embodiment (not illustrated), SMRAM 623 retains the authentication object and provides the authentication object to secure post office box module 642 for each subsequent authorization request. In another embodiment (not illustrated), SMRAM 623 and secure post office box module 642 can represent a common secure memory space for CHV system 600, thus eliminating the need for the authentication object transfer between SMRAM 623 and secure post office box module 642.

Figure 10:
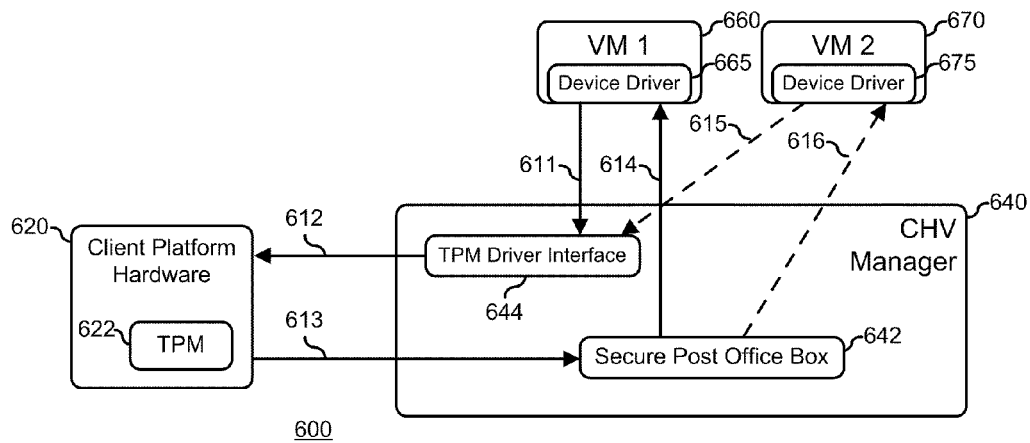
FIG. 10 is a functional block diagram illustrating another embodiment of a client hosted virtualization system and a method of providing secure access to a trusted platform module.

FIG. 10 illustrates another embodiment of CHV system 600 including client platform hardware 620, CHV manager 640, and virtual machines 660 and 670. Client platform hardware 620 includes a TPM 622. CHV manager 640 includes secure post office box module 642 and a TPM driver interface 644. Virtual machines 660 and 670 include device drivers 665 and 675, respectively. Virtual machines 660 and 670 have periodic reason to access TPM 622 for various encryption/decryption services, for validating hardware associated with CHV system 600, for validating software operated on virtual machines 660 and 670, for other trusted processing operations, or a combination thereof. When virtual machine 660 needs to access TPM 622, device driver 665 generates a TPM request 611 that is sent to CHV manager 640. TPM driver interface 644 receives the TPM request 611 and forwards CHV manager TPM request 612 to TPM 622. TPM 622 receives CHV manager TPM request 612, creates TPM data, and generates a TPM response 613 that sends the TPM data to secure post office box module 642. Secure post office box module 642 stores the TPM data, and also generates a CHV manager TPM response 614 that sends the TPM data to device driver 665. When virtual machine 670 needs to access the TPM data, device driver 675 generates a TPM request 615 TPM driver interface 644. CHV manager then generates a CHV manager TPM response 616 that sends the TPM data to device driver 675.

Figure 11:
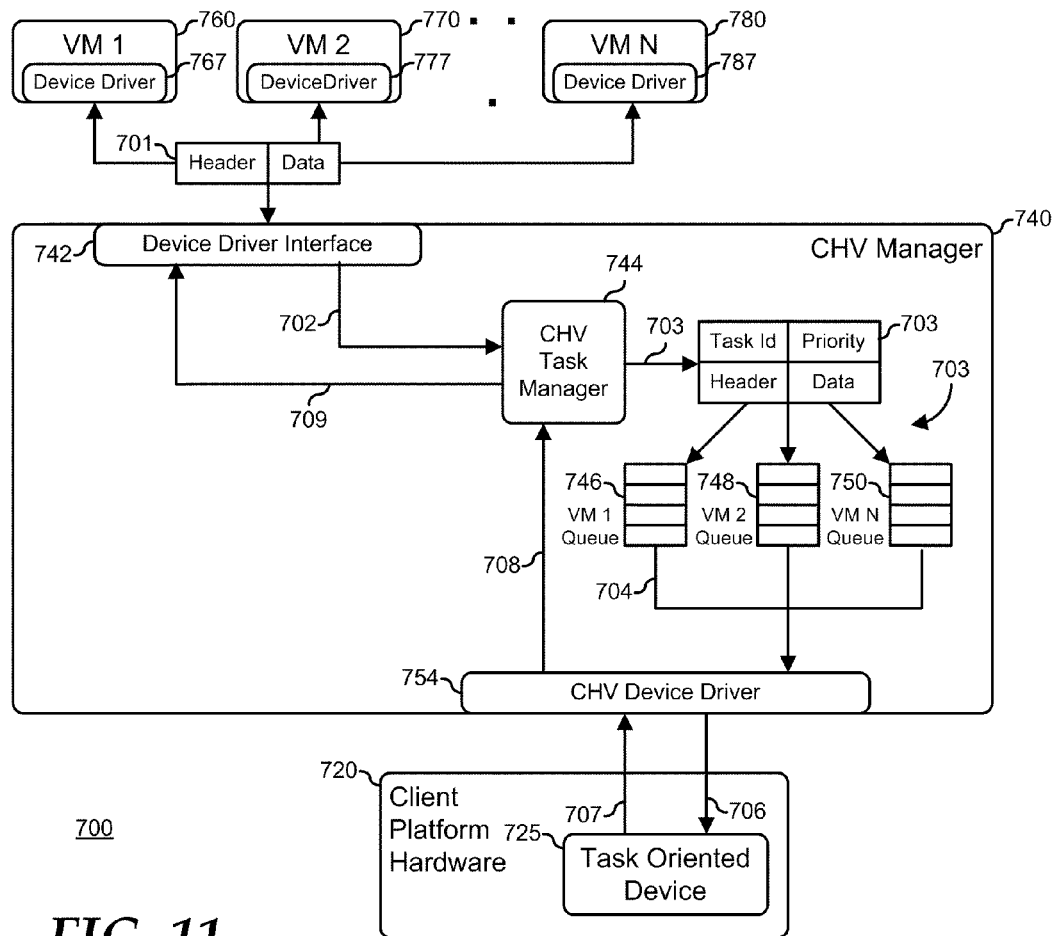
FIG. 11 is a functional block diagram illustrating another embodiment of a client hosted virtualization system and a method of supporting task oriented devices in a client hosted virtualization system.

FIG. 11 illustrates an embodiment of a CHV system 700 including client platform hardware 720, a CHV manager 740, and virtual machines 760, 770, and 770. Client platform hardware 720 includes a task oriented device 725. Task oriented device 725 is characterized by the fact that transactions targeted to task oriented device 725 are not amenable to time sliced execution, but are atomic, such that a transaction provided to task oriented device 725 is processed by the task oriented device as a whole transaction. An example of task oriented device 725 includes a GPE engine, a deep packet inspection engine, another task oriented device, or a combination thereof. CHV manager 740 includes a device driver interface 742, a CHV task manager 744, virtual machine transaction queues 746, 748, and 750, and a CHV device driver 754. Virtual machine transaction queues 746, 748, and 750 are associated with virtual machines 760, 770, and 780, respectively. Virtual machines 760, 770, and 770 include device drivers 767, 777, and 787, respectively. CHV Manager 740 operates to receive requests for the services of task oriented device 725, segregate the requests based upon the issuing virtual machine 760, 770, or 780, determine a priority for the request and issue the request to task oriented device 725. When task oriented device 725 responds to the request, CHV manager 740 returns the response to the requesting virtual machine 760, 770, or 780.

When one or more of virtual machines 760, 770 and 780 have need of the service of task oriented device 725, they generate a task oriented device transaction 701 from device drivers 767, 777, and 787 that is received by device driver interface 742. The task oriented device transaction preferably includes a header and data. The header identifies the type of transaction, the source of the transaction, other information about the transaction, instructions for the execution of the transaction, or a combination thereof. For example, where task oriented device 725 is an encryption/decryption engine or security processor, the header can include an encryption key identifier, a decryption algorithm identifier, an action identifier, other information used by an encryption/decryption engine or security processor, or a combination thereof. The data includes the information to be processed by task oriented device 725. Device driver interface 742 generates a task oriented device request 702 that is received by CHV task manager 744. The task oriented device request includes the header and data from the task oriented device transaction.

CHV task manager 744 operates to identify the source of the task oriented device request, to determine a priority, and to place a prioritized task oriented device request 703 into the virtual machine transaction queue 746, 748, or 750 associated with the particular virtual machine 760, 770, or 780 that generated the task oriented device transaction. The prioritized task oriented device request includes the header and the data from the task oriented device transaction, a task identifier field, and a priority field. When a particular prioritized task oriented device request reaches the head of the particular virtual machine transaction queue, the virtual machine transaction queue issues a current task oriented device request 704 to CHV device driver 754. CHV device driver 754 generates an issued task oriented device transaction 706 to task oriented device 725.

Task oriented device 725 performs the requested task identified in the issued task oriented device request and issues a task oriented device response 707 to CHV device driver 754. CHV device driver 754 forwards the task oriented device response to CHV task manager 744. CHV device task manager 744 matches the task oriented device response with the associated prioritized task oriented device request to determine the virtual machine 760, 770, or 780 that issued the associated task oriented device transaction, and forwards the task oriented device response to device driver interface 742 for response to the associated virtual machine 760, 770, or 780.

Figure 12:
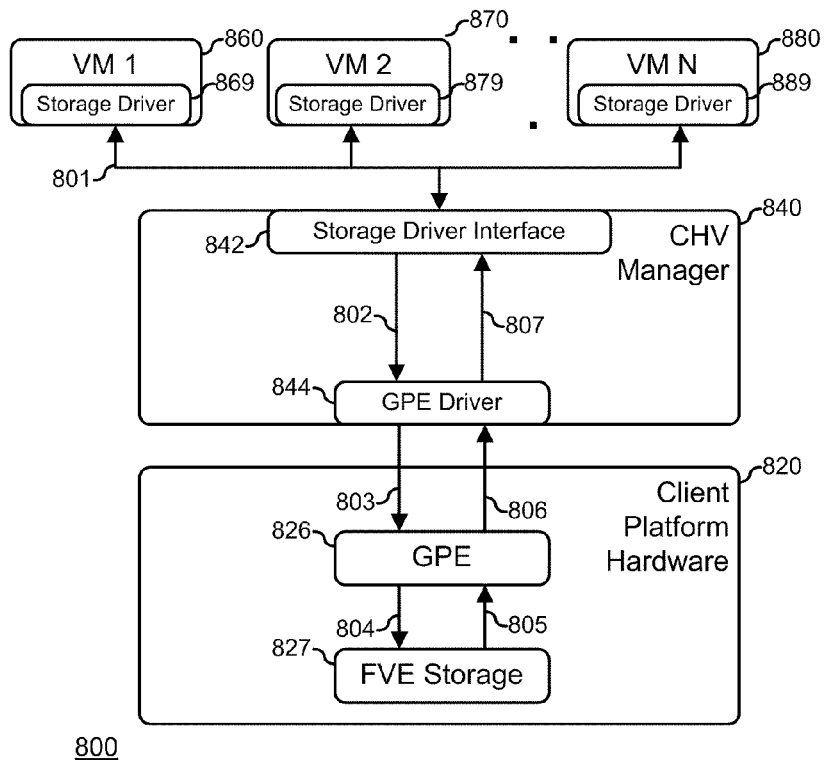
FIG. 12 is a functional block diagram illustrating another embodiment of a client hosted virtualization system and a method of supporting full volume encryption devices for virtual machines that access a common storage device in the client hosted virtualization system.

FIG. 12 illustrates an embodiment of a CHV system 800 including client platform hardware 820, a CHV manager 840, and virtual machines 860, 870, and 880. Client platform hardware 820 includes a GPE 826 and a full volume encryption (FVE) storage device 827. CHV manager 840 includes a storage driver interface 842, and a GPE driver 844. Virtual machines 860, 870, and 880 include storage drivers 869, 879, and 889, respectively. Here CHV manager 840 functions to provide a unified encrypted storage capacity for virtual machines 860, 870, and 880, in addition to an unencrypted storage capacity.

When one or more of virtual machines 860, 870 or 880 issue a storage request, the virtual machine generates a storage transaction 801 from storage drivers 869, 879, or 889 that is received by storage driver interface 842. Device driver interface 742 determines if the storage transaction is intended for FVE storage device 827 or for an unencrypted storage device (not illustrated). If the storage transaction is intended for FVE storage device 827, device driver interface 742 forwards the storage request 802 to GPE driver 844, which in turn forwards the storage request 803 to GPE 826. If the storage request is a write request, then GPE 826 encrypts a data portion of the storage request in accordance with information in a header portion of the storage request, and stores the encrypted data on FVE storage device 827. If the storage request is a read request, then GPE 826 issues the storage request 804 to FVE storage device 827, and FVE returns encrypted data 805 to GPE 826. GPE 826 decrypts the encrypted data based upon information in the header portion of the storage request, and forwards decrypted data 806 to GPE driver 844. GPE driver 844 forwards the decrypted data 807 to storage driver interface 842 which returns the decrypted data to the requesting virtual machine 860, 870, or 880.

Figure 13:
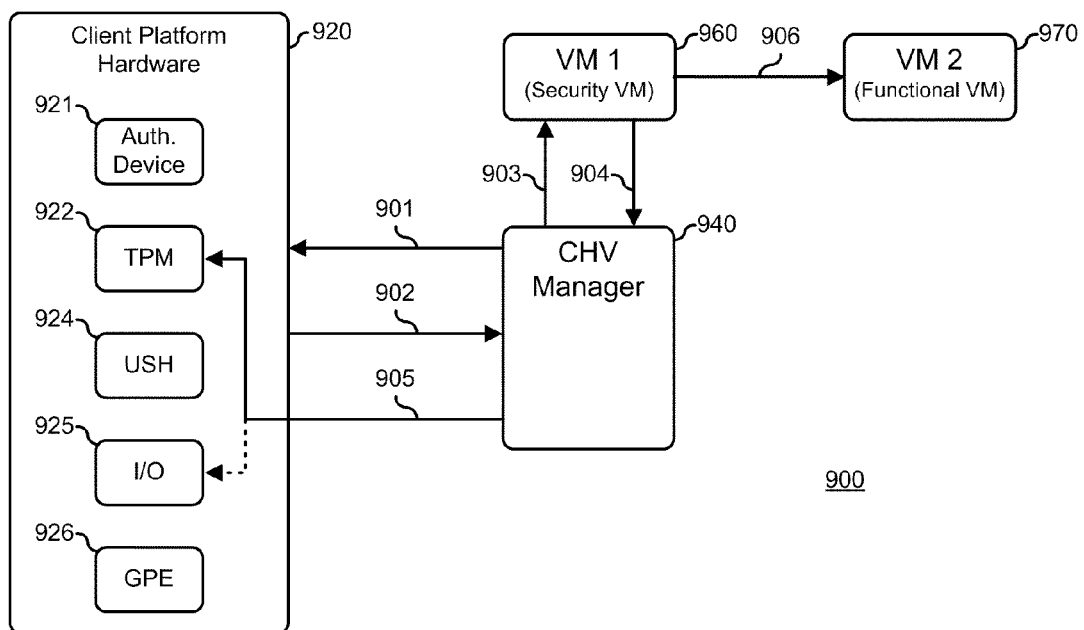
FIG. 13 is a functional block diagram illustrating another embodiment of a client hosted virtualization system and a method of supporting pre-boot authentication in the client hosted virtualization system.

FIG. 13 illustrates an embodiment of a CHV system 900 including client platform hardware 920, a CHV manager 940, and virtual machines 960 and 970. Client platform hardware 920 includes an authentication device 921, a TPM 922, a USH 924, an I/O port 925, and a GPE 926. Virtual machine 960 is a security virtual machine. Virtual machine 970 is a functional virtual machine. CHV manager 940 operates to assign the secure resources of CHV system 900 (such as authentication device 921, TPM 922, USH 924, and GPE 926) to virtual machine 960. As such, rights to the secure resources are passed to virtual machine 960. In addition, CHV manager 940 assigns other resource of CHV system 900 (such as I/O port 925) to virtual machine 960, and rights to the other resources are passed to virtual machine 960. In a particular embodiment, the binding of the resources to virtual machine 960 is performed by CHV manager 940 when CHV system 900 is booted, and prior to the launching of any additional virtual machines such as virtual machine 970. Then, when virtual machine 970 is launched, the bindings, rights, access, and authentication for virtual machine 970 are managed through virtual machine 960.

In binding the resources to virtual machine 960, authentication certificates and user credentials are verified through TPM 922, or through I/O 925 to storage devices (not illustrated) of CHV system 900 or to external servers (not illustrated) that are connected to the CHV system. Access to the storage devices can be encrypted through GPE 926. A secure communication channel can be established to the external servers through a PKI infrastructure or a VPN connection. Where the authentication certificates are verified through TPM 922, the authentication certificates can be pre-loaded onto CHV system 900 by the manufacturer, alleviating the need to obtain the certificates when the CHV system is first powered on. Additionally, when the resources of CHV system 900 are fully assigned to virtual machine 960, the configuration can be sealed and digitally signed, such that each time CHV system is powered on, tampering can be detected by comparing the configuration at boot with the signed configuration.

When CHV system 900 is powered on, CHV manager 940 determines the configuration of client platform hardware 920 in operation 901 and receives authentication certificates and user credentials from the client platform hardware in operation 902. CHV manager 940 assigns the resources of CHV system 900 to virtual machine 960 in operation 903. If CHV system 900 is being powered on for the first time, virtual machine 960 digitally signs the resource bindings and provides the digital signature to CHV manager 940 in step 904. CHV manager securely stores the digital signature to either TPM 922 or to the storage device of external server in step 905. When virtual machine 970 is launched, virtual machine 960 provides the bindings needed by virtual machine 970 in step 906.

Figure 14:
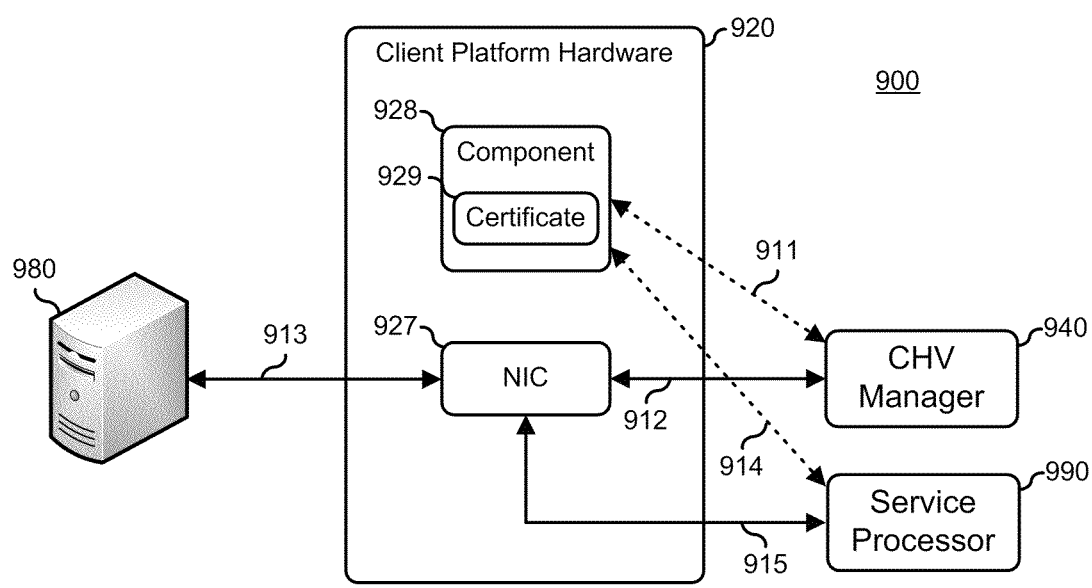
FIG. 14 is a functional block diagram illustrating another embodiment of a client hosted virtualization system and a method of supporting component authentication in the client hosted virtualization system.

FIG. 14 illustrates another embodiment of CHV system 900 including client platform hardware 920, a CHV manager 940, and a service processor 990. Client platform hardware 920 includes a NIC 927 and another component 928. CHV system 900 is connected to an authentication server 980. Component 928 includes a certificate 929. Certificate 929 is generated by the manufacturer of component 928 using a private key held by the manufacturer, and is combined with a unique number associated with the component (such as a serial number). Certificate 929 is securely stored by component 928, such as in a storage location of a read-only device of the component, or embedded in an integrated circuit of the component.

During system power up, or when component 928 is installed into CHV system 900, CHV manager 940 checks the validity of certificate 929. If certificate 929 cannot be validated, then CHV manager 940 isolates component 928, denying access to the functions of the component to users of CHV system 900, or grants limited functionality to the features of the component. For example, if the component is a storage device, access may be granted to view a directory of the storage device, but not to copy information from the storage device to CHV system 900.

In a particular embodiment, certificate 929 is checked locally to verify that certificate 929 is authentic, in operation 911. For example, CHV system 900 can be pre-loaded with authenticated components, and the authentication credentials can be stored in TPM 922. If no authentication credentials are available locally, then CHV manager 940 determines if CHV system 900 is connected to authentication server 980 in step 912. If so, CHV manager 940 obtains the authentication credential from authentication server 980 in step 913. If there is no local copy of the authentication credential, if there is no connection to authentication server 980, or if certificate 929 is not validated by the authentication server, then the functionality of component 928 is limited. In a particular embodiment, when component 928 is installed into CHV system 900, but before the CHV system is powered on, service processor 990 checks locally to verify that certificate 929 is authentic, in operation 914. If no authentication credentials are available locally, then service processor 990 determines if CHV system 900 is connected to authentication server 980 and obtains the authentication credential from authentication server 980 in step 915. In this way, the authentication credential can be stored locally prior to power up of CHV system 900.

When referred to as a "device," a "module," or the like, the embodiments described above can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A client system update network comprising:
a client hosted virtualization system (CHVS) having:
a security processor; and
a non-volatile memory including:
first code to implement a basic input/output system for the CHVS; and
second code to implement a virtualization manager, wherein the
virtualization manager operates to initialize the CHVS and launch a virtual machine on the CHVS; and
a client update system coupled to the CHVS to:
receive third code including an update to the second code;
encrypt the third code;
establish a secure communication channel with the CHVS with the security
processor, to:
authenticate the CHVS; and
send the third code to the CHVS if the CHVS is authenticated;
wherein the CHVS operates to:
receive the third code;
decrypt and authenticate the third code with the security processor; and
in response to determining that the third code is authentic, overwrite the non-volatile memory such that the second code is replaced with the third code; and
wherein the CHVS is configurable. to execute the first code and not the third code, or to execute the third code and not the first code.

2. The client system update network of claim 1, wherein the update comprises an update to the code to implement the virtualization manager.

3. The client system update network of claim 1, wherein the update comprises a security policy.

4. The client system update network of claim 1, wherein the update comprises an update policy.

5. The client system update network of claim 1, wherein the update is digitally signed.

6. The client system update network of claim 1, wherein the secure communication channel comprises a virtual private network.

7. The client system update network of claim 6, wherein the virtual private network uses a public key infrastructure to encrypt and decrypt transmission of the third code.

8. The client system update network of claim 6, wherein the virtual private network uses a secure sockets layer to encrypt and decrypt transmission of the third code.

9. A method of updating a client hosted virtualization system (CHVS), the method comprising:
- storing first code in a non-volatile memory of the CHVS, the first code being to implement a basic input/output system, wherein the basic input/output system operates to perform a first initialization of the CHVS;
- storing second code in the non-volatile memory, the second code being to implement a virtualization manager, wherein the virtualization manager operates to perform a second initialization of the CITVS and to launch a virtual machine on the CHVS;
- establishing a secure communication channel with a client update system' via a network interface of the CHVS, the secure communication channel being established by a security processor of the CHVS;
- receiving at the client update system third code comprising an update to the second code;
- receiving via the secure communication channel the third code from the client update system;
- decrypting the third code;
- authenticating the third code;
- in response to determining that the third code is authentic, overwriting the non-volatile memory such that the second code is replaced with the third code;
- configuring the CHVS in a first configuration to execute the first code to perform the first initialization of the CHVS and to not execute the third code; and
- configuring the CHVS in a second configuration to execute the third code to perform the second initialization of the CHVS, to not execute the first code, and to launch a first virtual machine.

10. The method of claim 9, wherein the update comprises a security policy.

11. The method of claim 9, wherein the update comprises an update policy.

12. The method of claim 9, wherein the secure communication channel comprises a virtual private network.

13. The method of claim 12, wherein the virtual private network uses a public key infrastructure to encrypt and decrypt transmission of the third code.

14. The method of claim 12, wherein the virtual private network uses a secure sockets layer to encrypt and decrypt transmission of the third code.

15. The method of claim 9, wherein the update comprises an update to the code to implement the virtualization manager.

16. The method of claim 9, wherein the update is digitally signed.

17. A non-transitory computer-readable medium including code for performing a method of updating a client hosted virtualization system (CHVS), the method comprising:
- storing first code in a non-volatile memory of the CHVS, the first code being to implement a basic input/output system, wherein the basic input/output system operates to perform a first initialization of the CHVS;
- storing second code in the non-volatile memory, the second code being to implement a virtualization manager, wherein the virtualization manager operates to perform a second initialization of the CHVS and to launch a virtual machine on the CHVS;
- establishing a secure communication channel with a client update system via a network interface of the CHVS, the secure communication channel being established by a security processor of the CHVS;
- receiving at the client update system third code comprising an update to the second code;
- receiving via the secure communication channel the third code from the client update system;
- decrypting the third code;
- authenticating the third code;
- in response to determining that the third code is authentic, overwriting the non-volatile memory such that the second code is replaced with the third code;
- configuring the CHVS in a first configuration to execute the first code to perform the first initialization of the CHVS and to not execute the third code; and
- configuring the CHVS in a second configuration to execute the third code to perform the second initialization of the CHVS, to not execute the first code, and to launch a first virtual machine.

18. The computer-readable medium of claim 17, wherein the update comprises a security policy.

19. The computer-readable medium of claim 17, wherein the update comprises an update policy.

20. The computer-readable medium of claim 17, wherein the secure communication channel comprises a virtual private network.

* * * * *

UNITED STATES PATENT AND TRADEMARK OFFICE
CERTIFICATE OF CORRECTION

PATENT NO. : 9,134,990 B2
APPLICATION NO. : 13/104683
DATED : September 15, 2015
INVENTOR(S) : Yuan-Chang Lo et al.

It is certified that error appears in the above-identified patent and that said Letters Patent is hereby corrected as shown below:

In the Claims

Col. 19, Line 24, Claim 9, change "storing second code in the non-volatile memory, the second code being to implement a virtualization manager, wherein the virtualization manager operates to perform a second initialization of the CITVS and to launch a virtual machine on the CHVS" to --storing second code in the non-volatile memory, the second code being to implement a virtualization manager, wherein the virtualization manager operates to perform a second initialization of the CHVS and to launch a virtual machine on the CHVS--

Signed and Sealed this
Fifth Day of July, 2016

Michelle K. Lee
*Director of the United States Patent and Trademark Office*